United States Patent Office 2,941,875

Patented June 21, 1960

2,941,875

METHOD OF ETCHING A GERMANIUM SURFACE

Akio Amaya, Tokyo, Japan, assignor to Sony Corporation, Shinagawa-ku, Tokyo, Japan, a corporation of Japan No Drawing. Filed Aug. 14, 1957, Ser. No. 678,029

Claims priority, application Japan Aug. 31, 1956

2 Claims. (Cl. 41—42)

This invention relates to a method of etching a semiconductor surface, and more particularly to a method of etching a germanium surface with a new and novel chemical etchant which contains no strongly corrosive acid and by means of which there is obtained a flat and mirror-like finish on germanium.

There has been no suitable chemical etchant by which we can obtain mirror-like finish on germanium except one process.

This process, however, is very corrosive to metal and glass, injurious to human body and troublesome in handling or storing, because it contains strong acid such as hydrofluoric acid, nitric acid and halogen such as bromine.

It is an object of this invention to provide a novel method of etching germanium surfaces to be flat and mirror-like without using injurious etchant such as hydrofluoric acid, nitric acid etc.

It has also been well known that alkaline etching can be made by an alkaline solution of sodium or potassium hydrochlorite. By this etchant, however, the finish is not mirror-like but somewhat rippled because the etching rate thereof is preferential to crystal orientation, or fastest on (100) surface and slower on (110) and (111) surfaces of the crystal.

It is, therefore, an important object of this invention to provide an etchant which is suitable to finish a germanium surface to be mirror-like face without the above mentioned disadvantages.

Other objects, features and advantages of this invention will become apparent to those skilled in the art from the following detailed disclosure thereof.

Now description will mainly be taken in the case of a germanium crystal.

To a solution of hypochlorite is added a small amount of an inhibitor which reduces the dissolving action of the solution to the germanium dioxide formed by the action of hypochlorite on the germanium surface and removes a preferentiality of etching rate to crystal orientations. As the inhibitor, germanium dioxide dissolved to near saturation or carbon dioxide bubbled through the solution or the combination of the two were found suitable for this purpose.

The etchant employed in this invention is composed of hypochlorite concentration which is 0.01 to 5% as sodium salt and a suitable amount of an inhibitor such for example as a solution of germanium dioxide of 0.1 gr./100 cc. to near saturation or to about 0.8 gr./100 cc., carbon dioxide being bubbled and dissolved in the solution to saturation or to obtain pH of 6.5 to 6.6. Any amount of neutral salt such as sodium chloride may be added to the etchant, if desired.

*Example*

A 5% by weight aqueous sodium chloride solution in a glass beaker is bubbled with carbon dioxide gas (1 l./min. or more), constantly agitated by a stirrer and electrolyzed by the electric current through two graphite electrodes immersed in it. Germanium pellets or bars to be etched are put in this solution.

Sodium hypochlorite is formed by this electrolysis. Addition of germanium dioxide is not necessary in some cases because it is supplied from the germanium to be etched as the etching proceeds.

Definite etching rate is not yet determined because the concentration of hypochlorite in the solution decreases, and that of germanium dioxide increases as the etching proceeds.

However, under following conditions, flat mirror-like finish is obtained after three or more hours of etching:

Volume of etchant—900 cc.
Electrolysing current—5 A. D.C.
Initial concentration of sodium hypochlorite—0.5–0.6% by weight (final concentration decreases down to 0.3% or less)
$CO_2$ flow—1–2 l./min.
pH—6.5–6.6
Temperature—35–45° C.
Charge of germanium—2000–3000 pellets 2 mm. $\phi$ in diameter and 0.25 mm. thick It will be understood that modifications and variations may be effected without departing from the scope of the novel conceptions of this invention.

What is claimed is:

1. A method of etching a germanium surface, which comprises the steps of locating a germanium element in an aqueous solution consisting essentially of 0.01% to 5% by weight of sodium hypochlorite and germanium dioxide in a concentration of 0.1 gr./100 cc. to 0.8 gr./100 cc., while said element is located in said solution bubbling into the solution carbon dioxide to provide a pH of about 6.5–6.6, and maintaining the element in the solution until a mirror-like finish is obtained on the element.

2. A method of etching a germanium surface, which comprises the steps of locating a germanium element in an aqueous solution consisting essentially of 0.01% to 5% by weight of sodium hypochlorite, while said element is located in said solution bubbling into the solution carbon dioxide to provide a pH of about 6.5–6.6, and maintaining the element in the solution until a mirror-like finish is obtained on the element.

References Cited in the file of this patent

UNITED STATES PATENTS

| | | |
|---|---|---|
| 2,690,383 | Bradshaw | Sept. 28, 1954 |
| 2,715,110 | Packard | Aug. 9, 1955 |
| 2,890,159 | Amaya | June 9, 1959 |